US011036236B2

(12) United States Patent
Janssen et al.

(10) Patent No.: US 11,036,236 B2
(45) Date of Patent: Jun. 15, 2021

(54) LIGHT PROJECTION SYSTEM

(71) Applicant: Serve Robotics Inc., Redwood City, CA (US)

(72) Inventors: Colin Janssen, Vancouver (CA); Ali Haghighat Kashani, San Francisco, CA (US); Bastian Lehmann, Redwood City, CA (US); Sean Plaice, Redwood City, CA (US)

(73) Assignee: Serve Robotics Inc., Redwood City, CA (US)

( * ) Notice: Subject to any disclaimer, the term of this patent is extended or adjusted under 35 U.S.C. 154(b) by 195 days.

(21) Appl. No.: 16/203,051

(22) Filed: Nov. 28, 2018

(65) Prior Publication Data

US 2019/0163196 A1 May 30, 2019

Related U.S. Application Data

(60) Provisional application No. 62/591,733, filed on Nov. 28, 2017.

(51) Int. Cl.
*G05D 1/00* (2006.01)
*G05D 1/02* (2020.01)
(Continued)

(52) U.S. Cl.
CPC ............. *G05D 1/0244* (2013.01); *B60Q 1/50* (2013.01); *G01S 5/16* (2013.01); *G05D 1/0246* (2013.01); *B60Q 2400/50* (2013.01)

(58) Field of Classification Search
CPC .. G05D 1/0244; G05D 1/0246; G05D 1/0055; G05D 1/0212; G05D 1/0242;
(Continued)

(56) References Cited

U.S. PATENT DOCUMENTS

2009/0013922 A1 1/2009 Lin
2014/0028980 A1* 1/2014 Othmer ............... G01C 21/365
353/14

(Continued)

FOREIGN PATENT DOCUMENTS

EP 2689966 1/2014
EP 2837473 2/2015
(Continued)

OTHER PUBLICATIONS

International Patent Application No. PCT/US2018/062882 , "Invitation to Pay Additional Fees and, Where Applicable, Protest Fee", dated Mar. 8, 2019, 12 pages.

*Primary Examiner* — Dalena Tran
(74) *Attorney, Agent, or Firm* — Weaver Austin Villeneuve & Sampson LLP

(57) ABSTRACT

Provided is a light projection system that can be used to indicate a robot's path of travel, a robot including the light projection system, and methods for projecting light to indicate a robot's path of travel. The light projection system can by mounted to the body of the robot, and can be configured to project light onto the ground in front of the robot. The light projection system can be configured to project different illumination patterns that can indicate whether the robot is moving forward, turning, accelerating, and/or slowing down, among other examples.

18 Claims, 13 Drawing Sheets

(51) Int. Cl.
*G01S 5/16* (2006.01)
*B60Q 1/50* (2006.01)

(58) Field of Classification Search
CPC ......... G05D 1/0297; G05D 2201/0207; G05D 2201/0211; G05D 2201/0212; G01S 5/16; G01S 17/46; G01S 17/66; Y10S 901/01; G06K 9/00805; G06K 9/00335; G06K 9/00791; G06K 9/20; G06K 9/46; G06T 7/20; G06T 2207/30241; G06T 2207/30261
USPC .............. 701/400, 25, 28; 700/245; 348/119
See application file for complete search history.

(56) References Cited

U.S. PATENT DOCUMENTS

| | | | | |
|---|---|---|---|---|
| 2014/0214260 | A1* | 7/2014 | Eckert | B60Q 1/48 |
| | | | | 701/28 |
| 2015/0042485 | A1* | 2/2015 | Suessemilch | B25J 9/1674 |
| | | | | 340/815.4 |
| 2017/0232885 | A1* | 8/2017 | Drexler | H05B 45/10 |
| | | | | 315/80 |

FOREIGN PATENT DOCUMENTS

| | | |
|---|---|---|
| WO | 2004024497 | 3/2004 |
| WO | 2013034142 | 3/2013 |

\* cited by examiner

400

```
┌─────────────────────────────────────────────────────────────────────┐
│ Determining a path of travel for an autonomous robot, wherein the   │
│ autonomous robot is operable to travel within a space occupied by   │
│ people                                                              │
│ 402                                                                 │
└─────────────────────────────────────────────────────────────────────┘
                                   │
                                   ▼
┌─────────────────────────────────────────────────────────────────────┐
│ Determine an illumination pattern for indicating the path of travel,│
│ wherein the illumination pattern is configured to be projected onto │
│ a ground surface in front of the autonomous robot                   │
│ 404                                                                 │
└─────────────────────────────────────────────────────────────────────┘
                                   │
                                   ▼
┌─────────────────────────────────────────────────────────────────────┐
│ Configuring a mounting system to point a light fixture coupled to   │
│ the mounting system according to a direction indicated by the       │
│ illumination pattern                                                │
│ 406                                                                 │
└─────────────────────────────────────────────────────────────────────┘
                                   │
                                   ▼
┌─────────────────────────────────────────────────────────────────────┐
│ Configuring a focusing system to modify light projected by the      │
│ light fixture to conform to the illumination pattern                │
│ 408                                                                 │
└─────────────────────────────────────────────────────────────────────┘
```

*FIG. 4*

LIGHT PROJECTION SYSTEM

CROSS-REFERENCES TO RELATED APPLICATIONS

This application claims priority to U.S. Provisional Patent Application No. 62/591,733, filed on Nov. 28, 2017, which is hereby incorporated by reference herein in its entirety and for all purposes.

BACKGROUND

An autonomous robot can be programmed to travel from a first location to second location. "Autonomous," in this context, means that the robot can receive instructions for moving from the first location to the second location, over a wireless or wired connection to a computer, for example, and can then execute the instructions without further input from a human operator. The robot may further be able to respond to situations that the robot encounters (e.g., obstacles, the presence of other moving objects in the vicinity, etc.), which the robot may be programmed to handle but which may not be explicitly provided for in the robot's travel plan.

In some cases, a robot's path may include a relatively uncontrolled space, where the rules that govern where the robot can go may be very broad, where the terrain may be variable, and where objects and people encountered by the robot may not be predictable. For example, the robot may travel out-of-doors, where the robot's path may be constrained to pedestrian thoroughfares, and where the robot may encounter people, dogs, cars, and other moving or stationary objects.

BRIEF SUMMARY

An autonomous robot may travel in spaces that may be shared with people. When encountering a robot traveling along a sidewalk or crossing a street, a person may not have an intuitive expectation of where the robot is headed. The robot, for example, being non-humanoid in shape, may not be able to mimic human body language that can indicate where a person is heading.

In various examples, provided is a light projection system that can be used to indicate a robot's path of travel. The light projection system can by mounted to the body of the robot, and can be configured to project light onto the ground in front of the robot. The light projection system can be configured to project different illumination patterns that can indicate whether the robot is moving forward, turning, accelerating, and/or slowing down, among other examples.

BRIEF DESCRIPTION OF THE DRAWINGS

Illustrative examples are described in detail below with reference to the following figures:

FIG. 4 includes a flowchart of an example process 400 for projecting light to indicate a robot's path of travel.

DETAILED DESCRIPTION

Figure 1A:
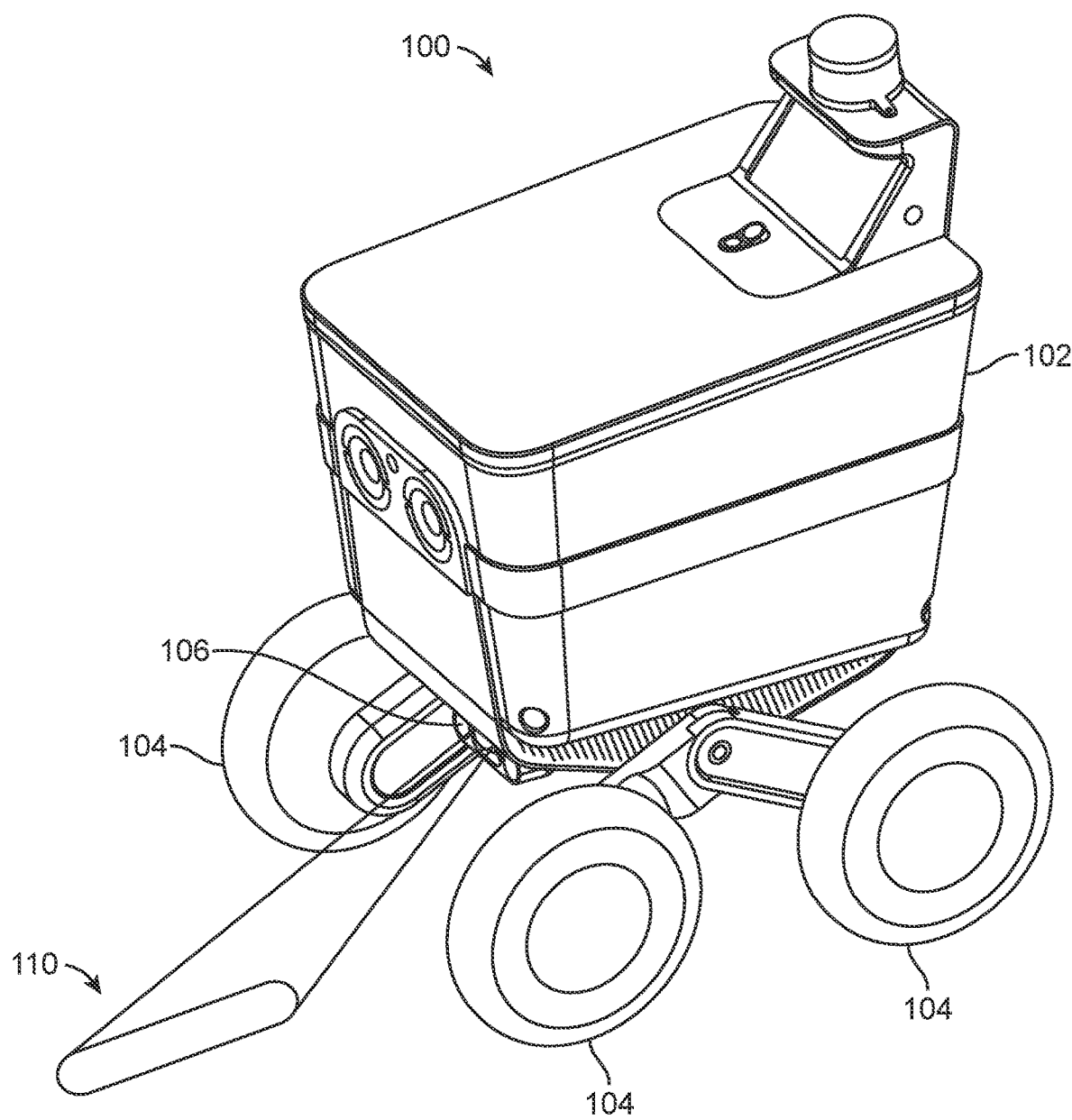
FIGS. 1A-1J include perspective illustrations of a robot that includes a light projection system.

An autonomous robot may travel in spaces that may be shared with pedestrians, cyclists, drivers, and other ambulatory human beings. For example, a robot may be programed to travel from one building in a town or city to another building, and in doing so may traverse sidewalks and cross streets. Sidewalks represent an example of a relatively uncontrolled space, as compared, for example, to a street. For example, sidewalks might not define lanes in which to travel, nor strict rules on direction of travel or right of way, among other examples. People intuitively navigate such spaces by reading each other's body language (e.g., the direction a person's body is facing, the direction a person's head is turned or gaze is fixed, etc.) or, with vehicles, by looking for indicators a person may be trained to recognize, such as turn signals, brake lights, the direction in which the front wheels of a vehicle are pointing, and so on.

When encountering a robot traveling along a sidewalk or crossing a street, however, a person may not have an intuitive expectation of where the robot is headed. In addition to making turns to follow the robot's programmed route, the robot may need to make small course corrections along the way to avoid unexpected obstacles, people, uneven terrain, and/or other situations that can cause the robot to deviate from a strictly straight path. Because the sidewalk may be a relatively unconstrained space, the robot may be free to choose whatever is the most efficient path. In such a situations, for the safety of the people the robot may encounter and the safety of the robot, it may be desirable for the robot to indicate where the robot is going.

In various implementations, provided is a light projection system for an autonomous robot that can indicate the robot's intended path of travel. The lighting system can include a light fixture oriented to project light onto the ground in front of the robot. Using a motorized mounting system and a focusing system, the light projection system can project an illumination pattern on the ground, where the illumination pattern indicates the robot's path of travel. In some examples, the illumination pattern can indicate the robot's intended direction. Alternatively or additionally, the illumination pattern can indicate a location where the robot is estimated to be in within a few seconds. In various examples, the illumination pattern is selected to provide as much information as possible in the simplest manner possible. By projecting the robot's path of travel onto the ground ahead of the robot, the light projection system can aid the robot in safely navigating among people.

FIGS. 1A-1E include perspective illustrations of a robot 100 that includes a light projection system 106. The robot 100 can include also include a body 102 and a set of wheels 104 that enable the robot 100 to travel across ground surfaces, including man-made surfaces such as sidewalks or floors, and natural surfaces, such as dirt or grass. Though not illustrated in FIG. 1, the robot 100 can further include a motor operable to drive the wheels 104, a steering system that can maneuver the wheels 104 to change the robot's direction of travel, and various sensors for detecting objects within a certain distance from the robot. The robot 100 can further include a computing device within the body 102, which can receive input from the sensors and can control the motor, steering system, and other operations of the robot 100. In some examples, the robot 100 can include multiple motors, such as a motor for controlling each wheel. In some examples, the robot 100 can further include location tracking devices, such as a Global Positioning System receiver or cellular antennas, to assist the robot 100 in determining the robot's current location. In some examples, the body 102 of the robot 100 can include a space for carrying cargo.

In various examples, the robot 100 may be operable to travel autonomously from a first location to a second location. For example, the robot 100 may be programmable to travel from one geographic location to another, where the geographic locations are identified by a street address, a latitude and longitude, or in another manner. As another example, the robot 100 may programmable to travel within a building, for example from one office in the building to another, where the robot's route may include doorways and in elevators.

Autonomous, in this context, means that, once the robot 100 receives instructions describing a route to traverse, the robot 100 can execute the instructions without further input from a human operator. The robot 100 may receive the instructions from an external computing device, such as a laptop computer, a desktop computer, a smartphone, or another type of computer. The computing device is "external" in that the computing is not mounted to the robot 100 and does not travel with the robot 100. The external computing device may have information such the robot's current location, destination, and possible routes between the robot's current location and the destination. The external computing device may further have access to geographic maps, floorplans, and other physical information that the external computing device can use to determine the robot's route.

To receive instructions, in some examples, the robot's on-board computing device can be physically connected to the external computing device, for example using a cable. Alternatively or additionally, the on-board computing device may include a wireless networking capability, and thus may be able to receive the instructions over a Wi-Fi and/or a cellular signal. In examples where the robot 100 has a wireless receiver, the robot 100 may be able to receive instructions describing the robot's route while the robot 100 is in a different location than the external computing device (e.g., the robot 100 is remote from the external computing device).

Once the robot 100 has been programmed, the robot 100 can receive a signal to begin traversing the route to the destination. The external computing device can send a signal to the robot's on-board computer, for example, or a human operator can press a physical button on the robot 100, as another example. In some examples, once the robot 100 is in motion, the robot 100 may be able to receive an updated route over a wireless connection, and/or may be able to request an updated route when the robot 100 finds that the original route is impassable or when the robot 100 loses track of its current location (e.g., the robot 100 becomes lost).

Once in motion, the robot 100 may encounter situations that may not be explicitly provided for in the instructions describing the robot's route. For example, the instructions may include left or right turns and distances to travel between turns, or successive waypoints the robot is to reach. The instructions, however, may not explicitly describe what the robot 100 should do should the robot encounter an obstacle somewhere along the way. The obstacle may not be noted in the data the external computer uses to determine the robot's route, or may be a mobile obstacle, so that the obstacle's presence or location may not be predictable. In these and other examples, the robot's on-board computing device can include instructions for adjusting the robot's path as the robot travels a route. For example, when the robot's sensors indicate that an object is located within a certain distance (e.g., three feet, five feet, and/or a distance that varies with the robot's current velocity) from the front of the robot 100, the on-board computer can cause the robot 100 to slow down and/or turn right or left to navigate around the object. Once the robot's sensors indicate that the obstacle has been bypassed, the on-board computer can adjust the robot's path back to the intended course, if needed.

In various examples, the robot's route may further include spaces that can be shared with people, who may be walking, running, riding bicycles, driving cars, or otherwise be ambulatory. In these examples, to assist the robot 100 in navigating among people, the robot 100 can include an array of sensors that can detect people or objects within a certain distance from the robot 100 (e.g., three feet, five, or another distance). Using these sensors, the robot's on-board computing device may be able to an approximate number and proximity of objects around the robot 100, and possibly also the rate at which the objects are moving. The on-board computer can then use this information to adjust the robot's speed and/or direction of travel, so that the robot 100 may be able to avoid running into people or can avoid moving faster than the flow of surrounding traffic.

In these and other examples, the robot 100 may not only be able to achieve the overall objective of traveling autonomously from one location to another, but may also be capable of the small adjustments and course corrections that people make intuitively while maneuvering among other people. The robot 100, however, may lack the physical indicators that a person may have that indicates to other people where the person is going or what the person is doing. For example, the direction the front of a person's body is facing or the direction the person is looking may indicate the direction in which the person is moving or is about to move. As another example, a person's hand or shoulder motions may indicate that the person is about to move faster or is about to stop moving.

In the example of FIGS. 1A-1E, the robot 100 is non-humanoid in form, and thus is not able to mimic the body language of a person that can convey the robot's intended path of travel. In various implementations, the robot 100 thus includes a light projection system 106 that can project an illumination pattern 110 on the ground in front of the robot 100. The light projection system 106 may be configured to project the illumination pattern 110 one foot, three feet, or another distance in front of the front wheels 104 of the robot, and/or between one foot and five feet (or another number of inches or feet) in front of the front wheel 104.

In the example of FIG. 1A, the light projection system 106 has configured the illumination pattern 110 in the shape of a vertical bar to indicate that the robot 100 is moving forward. Specifically, the bar is oriented parallel to the robot's forward direction of travel. In some examples, the light projection system 106 can also configure the illumination pattern 110 to move or blink (e.g., turn on and off) to further indicate that the robot 100 is moving forward. For example, the light projection system 106 can make the illumination pattern 110 intermittently stretch from a short bar or a spot to a longer bar, or can sweep the bar forwards and backwards, among other examples.

In various examples, the light projection system 106 can include a light fixture and a mounting system to which the light fixture is secured. The mounting system can include moveable parts, such as pivoting joints, which can enable the light projection system 106 to change the direction in which light from the light fixture is projected. The light projection system 106 can also include a focusing system that is able to change the intensity, direction, and/or shape of the projected light. The light projection system 106 can further include a variety of motors or actuators that can manipulate the mounting system or the focusing system. The light projection system 106 can further include a housing that encloses the components, or the light projection system 106 may be built into the body 102 of the robot 100.

The light fixture of the light projection system 106 can use one or more of various types light producing mechanisms. For example, the light fixture can include one or more Laser Emitting Diodes (LEDs), halogen bulbs, and/or lasers, among other examples. In some examples, the light fixture can include an array of light emitting elements. In some examples, the light projection system 106 can include multiple light fixtures. In various examples, the light fixture includes a switch or relay that can be actuated by an electrical signal to turn the light off and on.

The mounting system of the light projection system 106 can include at least two axis of rotational movement, so that the light fixture can be moved up or down (e.g., tilted) and left to right (e.g., panned). For example, the mounting system can include at least two pivoting joints that are capable of rotational motion, with the rotational axis of one joint being horizontal and approximately parallel to the ground and the rotational axis of a second joint being vertical and approximately perpendicular to the ground. In some examples, the mounting system can further include a third pivoting joint whose rotational axis is along the central axis of the light fixture, which can enable a rolling motion of the light fixture. As an example, the mounting system can include a motorized two-axis or a three-axis gimbal.

In various examples, the horizontal rotational axis of the mounting system can enable the light fixture to be tilted to project the illumination pattern 110 closer to the robot 100 or further away from the robot 100. In some examples, tilting the light fixture can have the effect of lengthening or shortening the beam projected by the light fixture.

In various examples, the vertical rotational axis of the mounting system can enable the light projected by the light fixture to be swept from left to right in front of the robot 100. As discussed further below, panning the projected light either to the left or to the right can be used to signal that the robot is turning.

In some examples, the mounting system and/or the light projection system 106 may be attached to the body 102 of the robot at an angle (e.g., tilted higher towards the rear of the robot 100 than the front) to better place the illumination pattern 110 on the ground in front of the robot 100. In these examples, the vertical axis of the mounting system may be at an angle from perpendicular to the ground.

The focusing system of the light projection system 106 can enable the light projection system 106 to change the intensity, shape, and/or direction of the illumination pattern 110. For example, the focusing system can include one or more lenses that can change the intensity or placement of the light emitted from the light fixture. As another example, the focusing system can include one or more reflectors that can change the shape or direction of the light. In this example, the reflectors may be moveable and motorized, so that the angle at which light hits a reflector can be changed. As another example, the focusing system can include one or more motorized apertures that can change the shape of the light. In this example, an aperture can be used to completely block the light emitted by the light fixture, so that the projected light can be made to blink without having to turn off the light source.

In various examples, the light projection system 106 can include a controller circuit that can control the motors that move the mounting system or adjust the focusing system. The controller circuit can include, for example, an integrated circuit device implementing a microprocessor or a microcontroller. In these examples, the integrated circuit device may be able to execute instructions stored on the device or on a memory device of the controller circuit. In various examples, the controller circuit may be wired to the motors in the light projection system 106 and can send signals over the wires to control the motors. In some examples, the light projection system 106 does not include separate control circuitry, and the on-board computing device may be directly wired to the motors that control the mounting system and focusing system.

Figure 1B:
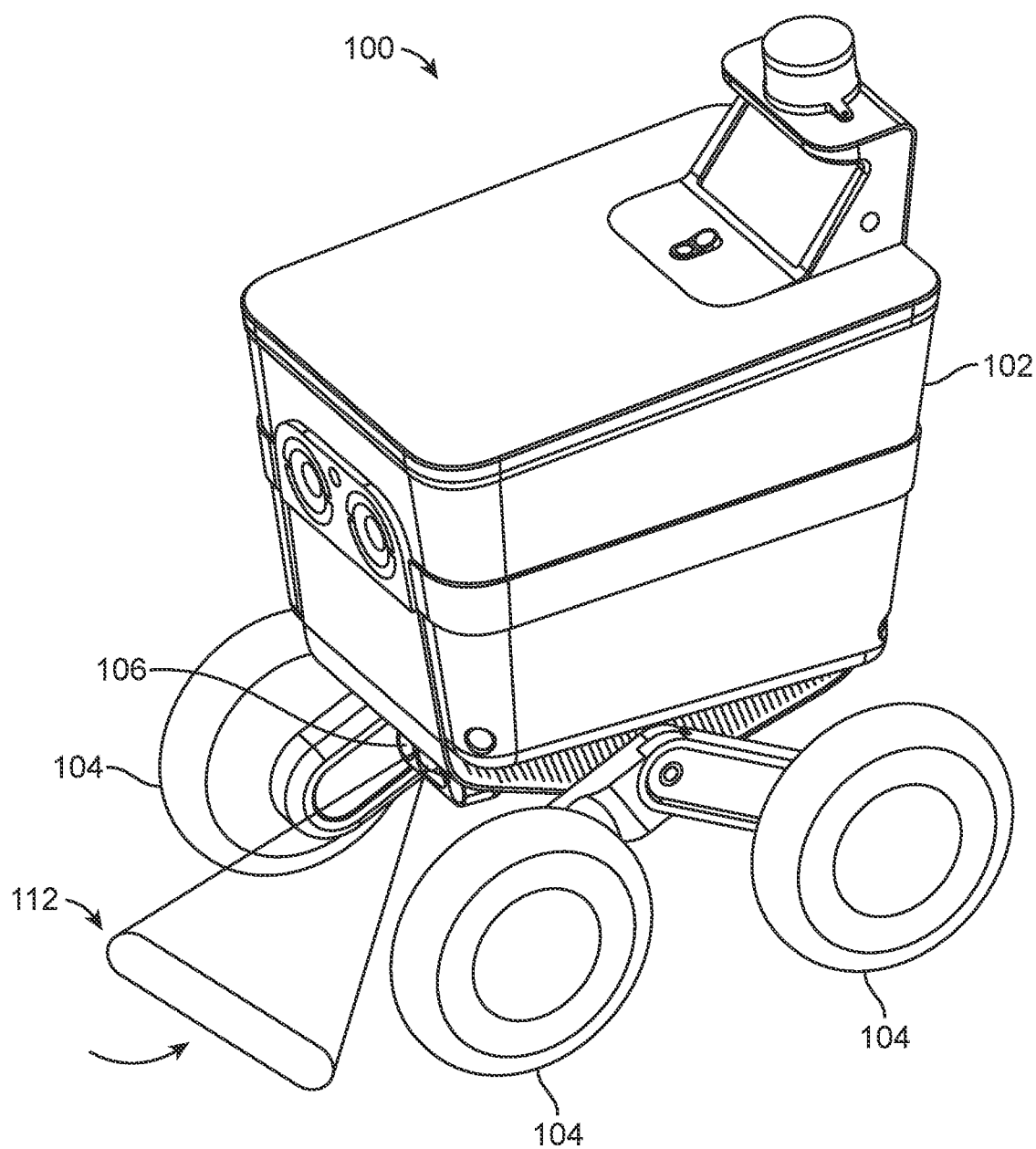

In the example of FIG. 1B, the light projection system 106 has configured an illumination pattern 112 for indicating that the robot 100 is turning to the left or is about to turn to the left. A left turn is used as an example in this illustration, with the understanding that an indication of right turn can be accomplished in a similar manner. The robot's on-board computing device, for example, may periodically or continuously review the robot's route or route adjustments to see where the robot 100 is supposed to be at the current moment and/or in a few seconds (e.g., three seconds, five seconds, or another number of seconds in the future). When the on-board computing device determines that the robot 100 is to make a left turn, the computing device can instruct the light projection system 106 to make adjustments to project the illumination pattern 112 that indicates a left turn. In some examples, the computing device's programming may cause the illumination pattern 112 to be projected a few seconds before the computing device instructs the robot 100 to execute the turn.

In the example illustrated in FIG. 1B, the illumination pattern 112 includes a bar that that is angled to the left of robot's central axis. The light projection system 106 can configure the illumination pattern 112, for example, by rotating the light fixture to the left along a vertical axis and rotating the light fixture counter-clockwise (from the point of view of the robot 100). Alternatively, the light projection system 106 can adjust one or more reflectors to change the angle of the light beam.

In some examples, the illumination pattern 112 for indicating a left turn can include motion, blinking of the light, and/or further shaping of the light, to aid in indicating the left turning motion. For example, the light projection system 106 can rotate the light fixture, to sweep the projected light from a central position to a left position. As another example, the light projection system 106 can intermittently change the projected light from a short bar or spot to a longer bar. As another example, the light projection system 106 may shape the light into an arc or curve that points to the left. In this example, the light projection system 106 may be able to make the projected light trace the illumination pattern 112 and/or blink the projected light on and off.

In various examples, the light projection system 106 can also be used to indicate the robot's velocity or a change in velocity. The robot's on-board computer may determine, for example, that the robot 100 is accelerating from being stopped, or is able to go faster than the robot's current speed. To indicate the robot's speed, In various examples, the light projection system 106 can change the shape of the light projected on the ground, and/or can make the projected light move.

Figure 1C:
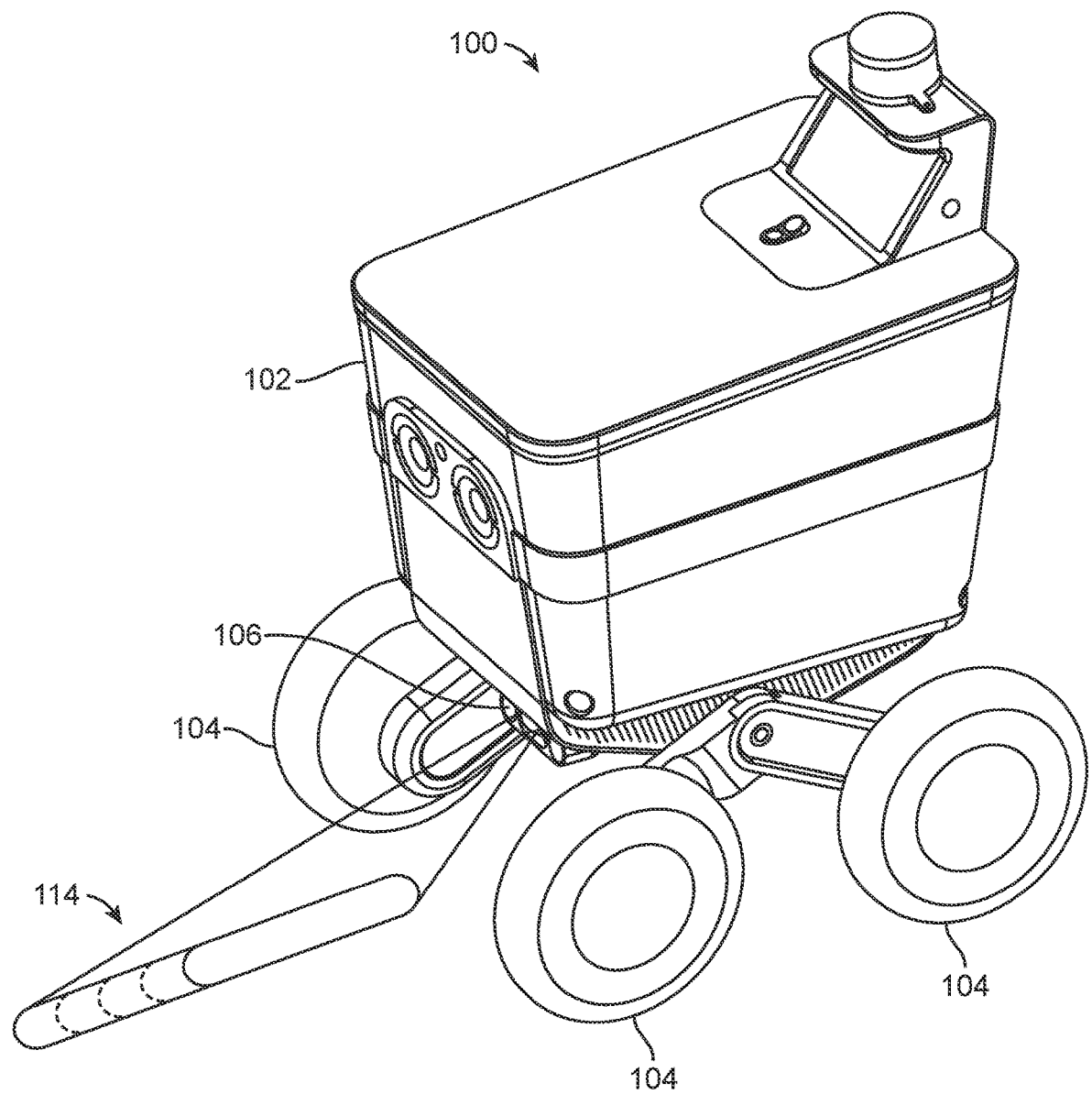

FIG. 1C illustrates an example of an illumination pattern 114 that can be used to indicate the robot's speed or velocity. In this example, the illumination pattern 114 includes a vertical bar that has been lengthened in proportion to the robot's velocity. The length of the bar can be an indicator, for example, of where the robot 100 will be in three to five seconds, or another amount of time. In some examples, the length of the bar can change actively. For example, the bar can have an initial length, which can increase to a second length, and then return to the first length, in an intermittent pattern. In some examples, the light projection system 106 can additionally cause the projected light to blink as the length of the bar changes.

Figure 1D:
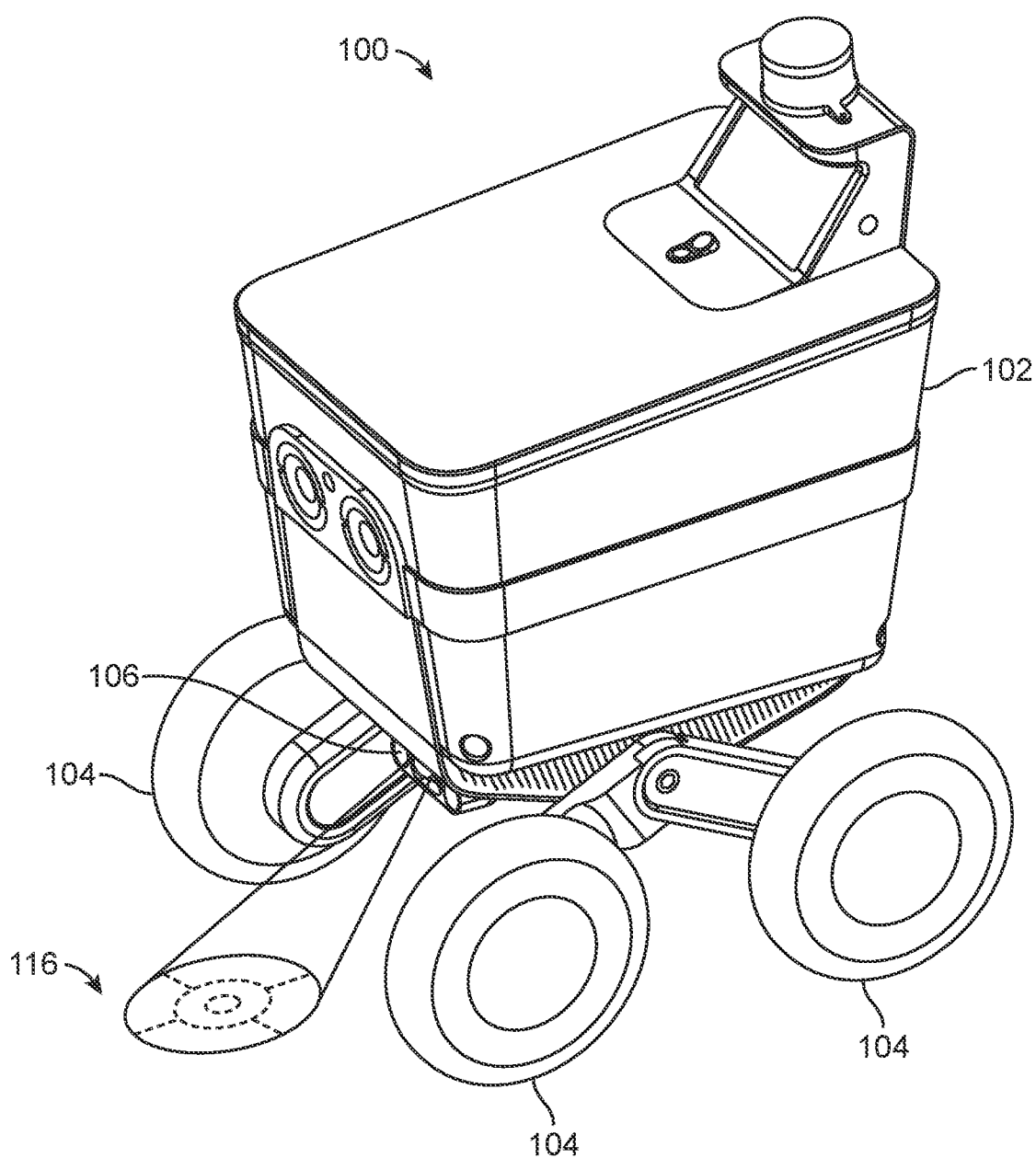

FIG. 1D illustrates an example of an illumination pattern 116 that can be used to indicate that the robot 100 is stopped or idle. In this example, the illumination pattern includes a circular shape that fluctuates smoothly between a first size and a smaller second size (or to off), such that the circular shape grows and shrinks. This illumination pattern 116 can mimic the steady breathing of a person who is sleeping. In other examples, the robot's status as stopped or idle can, alternatively or additionally, be indicated by turning off the light.

Figure 1E:
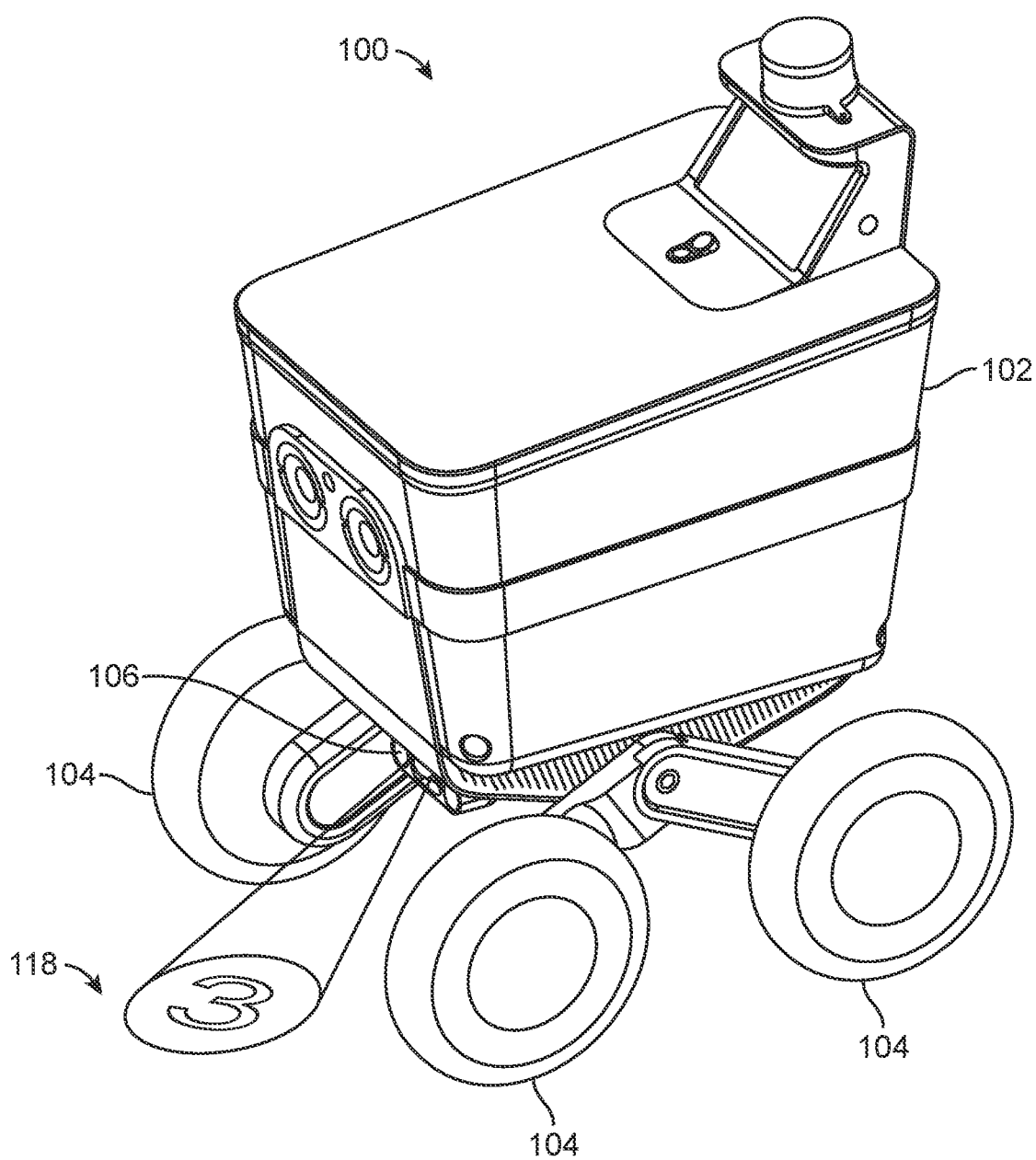

FIG. 1E illustrates an example of an illumination pattern 118 that can be used to indicate that the robot 100 is about to start moving from being fully stopped. In this example, the illumination pattern 118 projecting a decreasing series of numbers in sequence, indicating a countdown to zero. The countdown can start at 10 or 5 or another number, or a number that is based on a current situation around the robot 100 (e.g., how many people are nearby, whether the robot 100 needs to get the attention of the driver of a car, etc.). In some examples, once the countdown reaches zero, the illumination pattern 118 can include blinking the zero number a few times to indicate to passersby that the robot is about to do something.

Figure 1F:
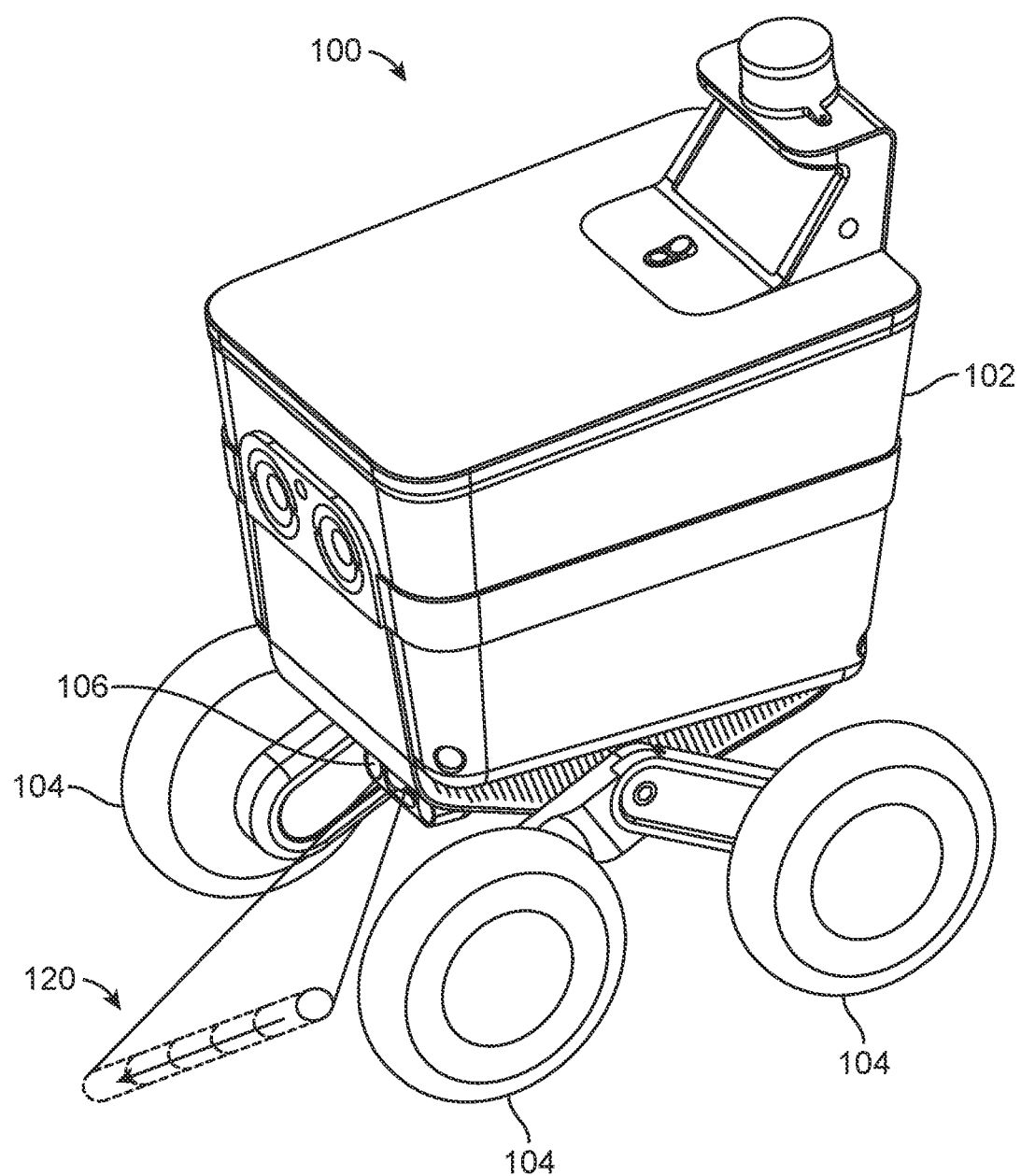

FIG. 1F. illustrates an example of an illumination pattern 120 that can be used to indicate that the robot 100 is accelerating from being fully stopped. In this example, the illumination pattern 120 starts as a spot that stretches smoothly into a bar. The pattern of spot-to-bar may then repeats, to give the indication that the robot 100 is about to start moving. The illumination pattern can include repeating the spot-to-bar pattern three or four times (or another number of times) before the robot 100 begins moving. Once the robot 100 is underway, the illumination pattern 120 can change, such as to the illumination pattern 110 illustrated in FIG. 1A.

Figure 1G:
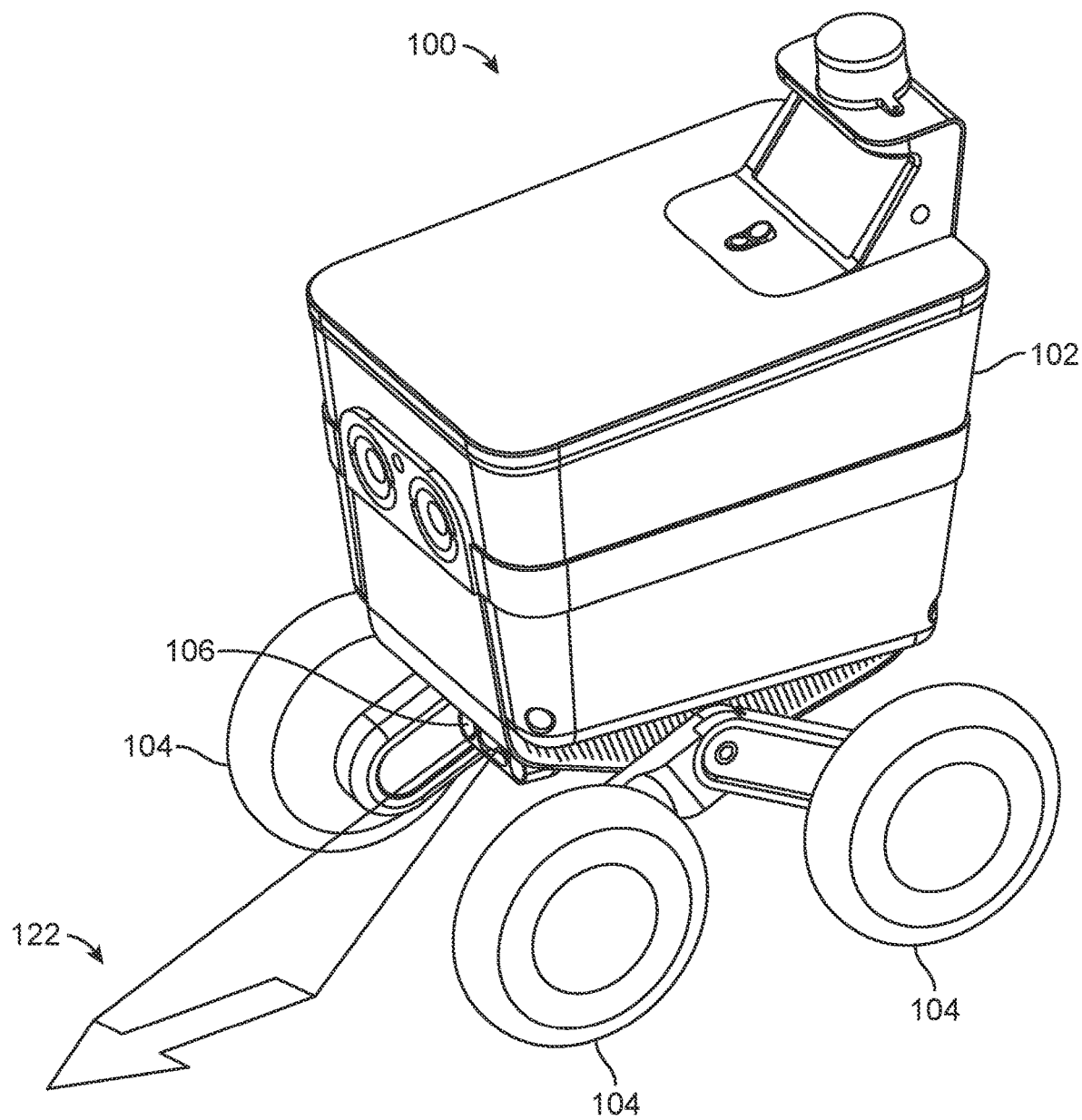

FIG. 1G illustrates another example of an illumination pattern 122 that the light projection system 106 can project to indicate that the robot 100 is moving forward. In this example, the illumination pattern 122 is in the shape of an arrow that points away from the robot 100 and in the direction of the robot's path. The arrow shape may be a more obvious indicator of the robot's direction of travel. As in the previous examples, the length of the arrow can indicate the robot's velocity and/or can move or blink to indicate a change in velocity. In various examples, the light projection system 106 can generate the illumination pattern 122 using a combination of lenses, reflectors, and/or apertures.

Figure 1H:
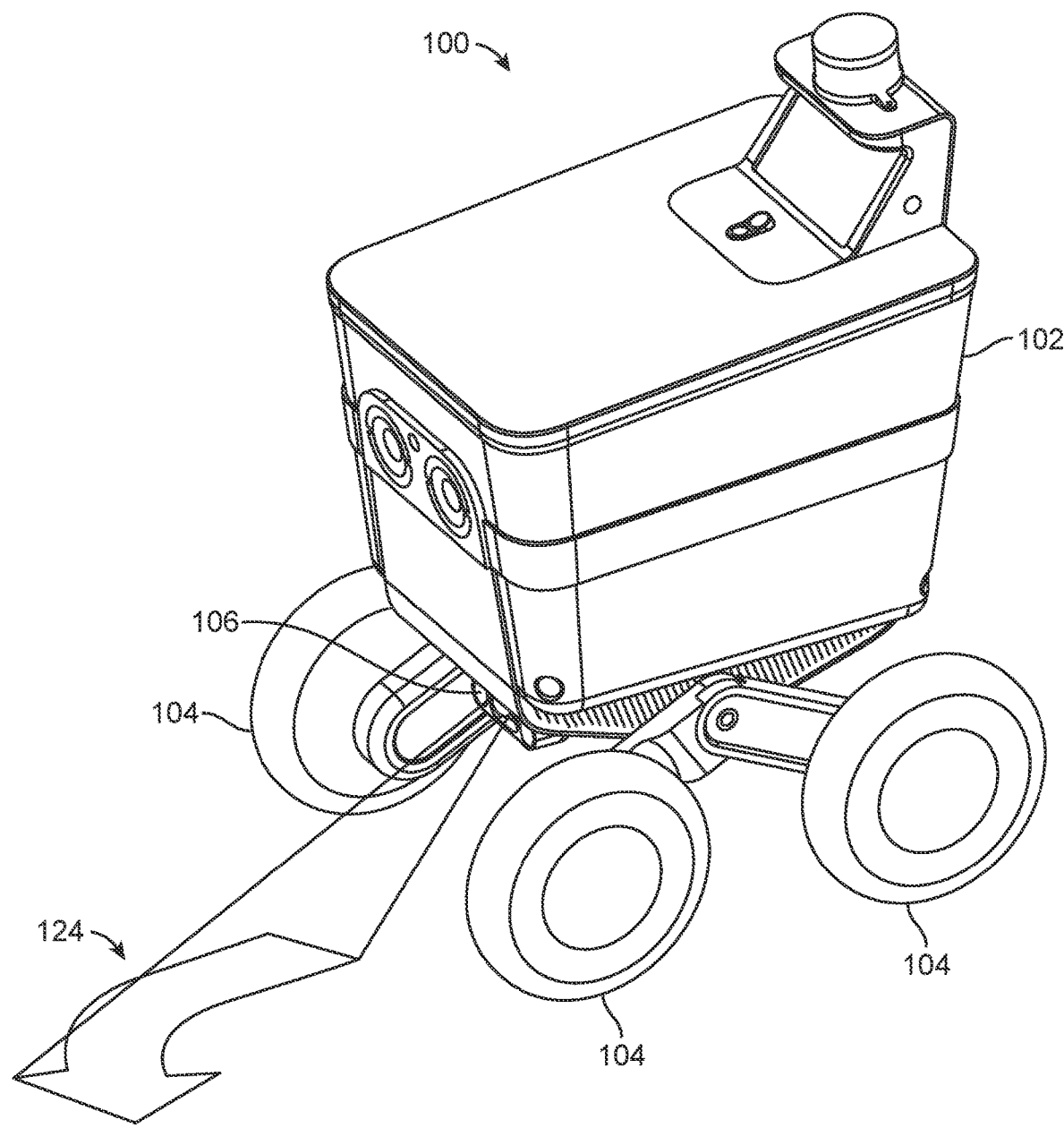

FIG. 1H illustrates an example of illumination pattern 124 for indicating that the robot 100 is turning or is about to turn left. In this example, the illumination pattern 124 is in the shape of an arrow that is curved to the left. In various examples, illumination pattern 124 may be stationary, or the light projection system 106 may blink or trace the light along the shape of the arrow to draw attention to the illumination pattern 124. In some examples the on-board computer may cause the robot 100 to follow the shape of the arrow while change the shape of the arrow to be consistent with the robot's path. For example, the arrow may be initially be curved, and as the robot 100 turns left along the curve of the arrow, the arrow can gradually become straight to reflect the robot's current path.

Figure 1I:
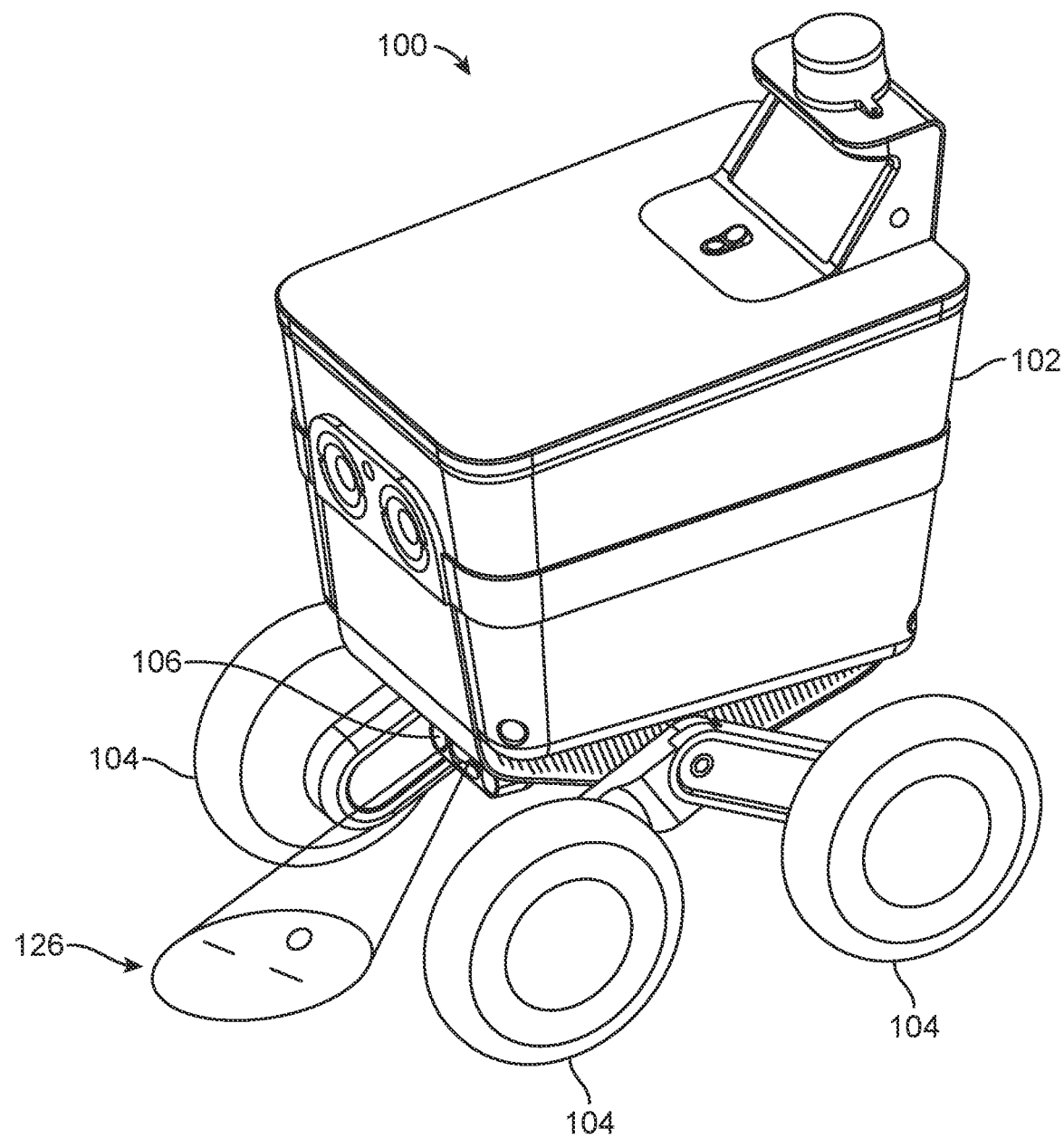

FIG. 1I illustrates an example of an illumination pattern 126 for indicating that the robot 100 is idle or stopped. In this example, the illumination pattern 126 includes a cartoon face, with eyes drawn as straight lines to indicate closed eyes, and a mouth drawn in an oval shape so that the face appears to be of a person who is sleeping. In some examples, the mouth can alternate between a larger over and a smaller oval, to imitate breathing. In other examples, that the robot 100 is idle can be indicated by projecting the letters "Zzz . . ." on the ground, possibly with animation or blinking of the letters.

Figure 1J:
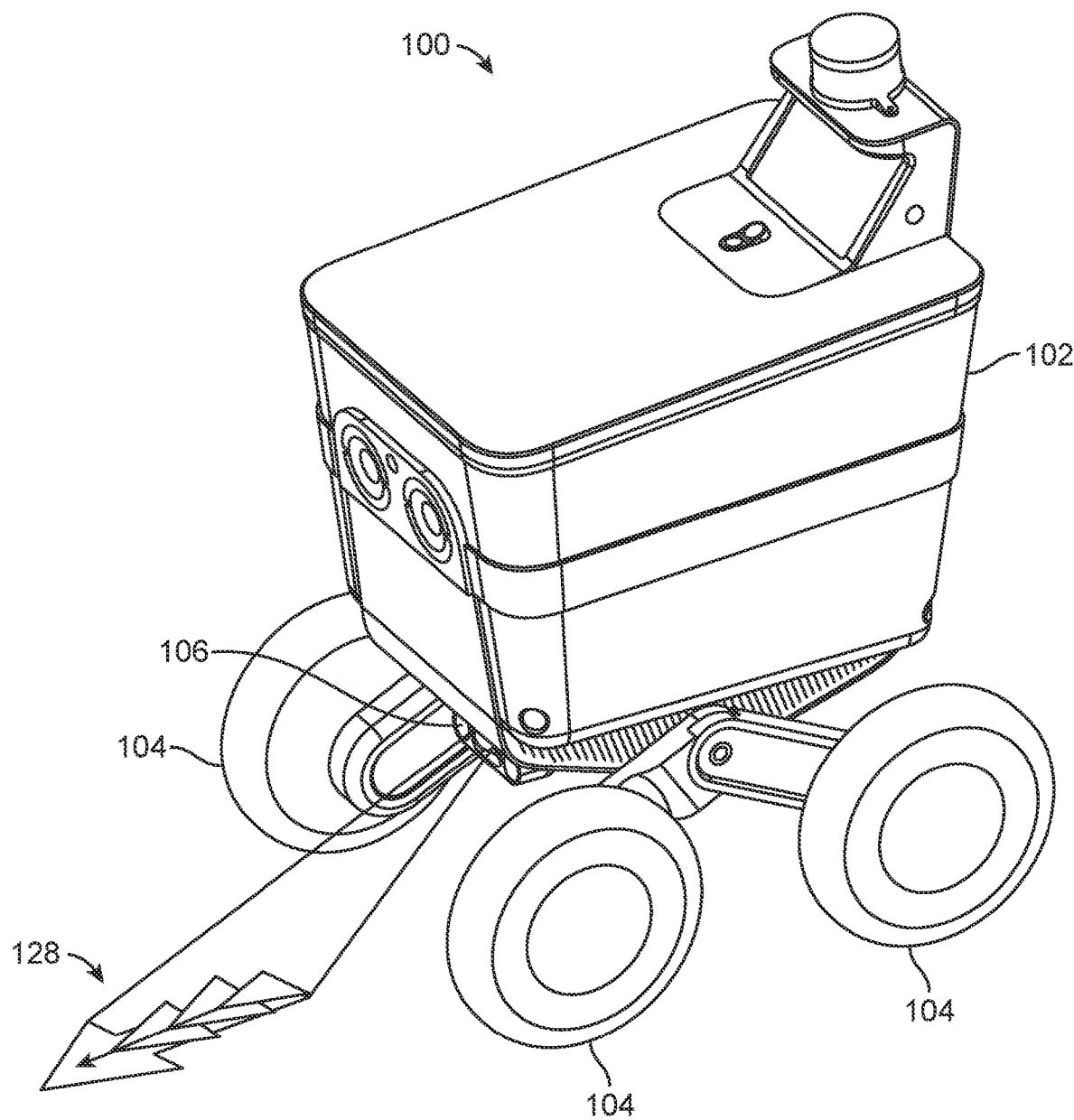

FIG. 1J illustrates an example of an illumination pattern 128 for indicating that the robot 100 is about to start moving from being fully stopped. In this example, the illumination pattern 128 includes an arrow that gradually appears, starting at the arrow point, and then lengths. The pattern of the arrow appearing and lengthening may repeat several times. In some examples, the illumination pattern 128 illustrated in FIG. 1J can be preceded by a countdown. In some examples, once the robot 100 begins moving, the illumination pattern 128 can change, for example to the illumination pattern 122 illustrated in FIG. 1G.

Figure 2:
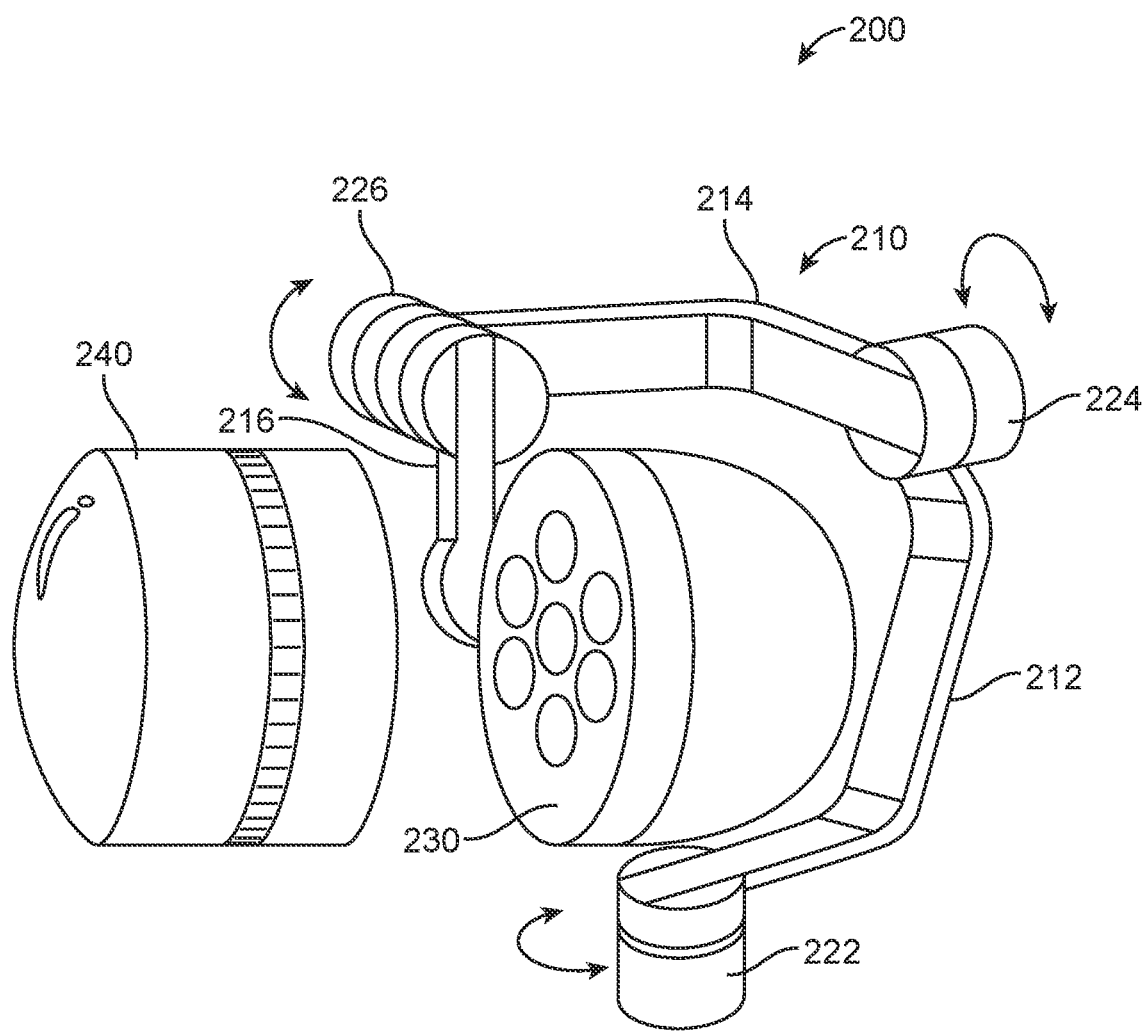
FIG. 2 includes a diagram of example components of a light projection device.

FIG. 2 includes a diagram of example components of a light projection device 200 that can be used to project the illumination patterns discussed with respect to FIG. 1A-1E. In the example of FIG. 2, various details have been omitted so as not to obscure the illustrated components. For example, a housing or enclosure for the light projection device 200 is not illustrated. As another example, the illustrated components may be connected to electrical wires for power and control signals, and these wires are not illustrated.

In various examples, the light projection device 200 can include a mounting system 210, a light fixture 230, and a focusing system 240. The mounting system 210 can provide a mechanical structure to which the light fixture 230 can be coupled. The mounting system 210 can also include moveable joints that enables the light projection device 200 to change the direction and/or angle in which light emitted by the light fixture 230 points. The light fixture 230 can project light of a suitable temperature, lumens, and/or frequency for the light to be visible when the light strikes a surface. The focusing system 240 can include various physical mechanisms that can change the intensity, direction, and/or shape of the light emitted by the light fixture 230. The focusing system 240 may be attached to the front face (e.g., the light emitting face) of the light fixture 230 and may include elements attached to the light fixture 230, or may be fixed to another part of the light projection device 200 that places the light fixture 230 in front of the light fixture 230.

In various examples, the mounting system 210 can include pivoting joints that enable a least two degrees of rotational motion. In the example of FIG. 2, the mounting system 210 includes a first joint 222, a second joint 224, and a third joint 226 so that the mounting system 210 includes three degrees of rotational motion. The mounting system 210 further includes a first arm 212 fixed between the first joint 222 and the second joint 224, a second arm 214 fixed between the second joint 224 and the third joint 226, and a third arm 216 fixed to the third joint 226 and to which the light fixture 230 can be attached. In some cases, the mounting system 210 illustrated in FIG. 2 may be referred to as a three-axis gimbal.

The joints of the mounting system 210 enable the mounting system 210 to rotate the light fixture 230 in various directions. The first joint 222 can have a vertical axis around which the first joint 222 can rotate. The first joint 222 thus enables left-to right rotation of the light fixture 230, which can also be referred to as a panning motion or a motion around the yaw axis. The first joint 222 can be coupled to a fixed portion of the light projection device 200, such as the device's housing, and can thus provide a base for the mounting system 210. The second joint 224 can have horizontal axis that is at 90 degrees from the axis of the first joint 222. The second joint 224 can enable clockwise and counter-clockwise rotation of the light fixture 230, or motion around the roll axis. The third joint 226 can have a horizontal axis that is perpendicular to the axes of both the first joint 222 and the second joint 224. The axis of the third joint 226 can also be perpendicular to the direction in which the light fixture 230 emits. The third joint 226 enables up and down rotation of the light fixture 230, which can also be referred to as tilting or motion around the pitch axis.

In various examples, the light projection device 200 can include one or more motors configured to rotate one or more of the joints. A motor, for example, can be built into one of the joints, or multiple of the joints can incorporate a motor. Alternatively motors can be mounted external to the joints and be affixed to the joints or the arms of the mounting system 210 to enable the motors to move the various parts of the mounting system 210.

The light fixture 230 can include one or more light emitting elements or sources enclosed within a housing. The light sources can include one or more of LEDs, halogen bulbs, lasers, other light emitting devices, or a combination of light emitting devices. In some examples, the light sources may be able to project light of different colors, and the light fixture 230 can include controls for changing the color that is projected. In some examples, the light fixture 230 can also include a reflector placed behind the lighting elements. The reflector may be motorized and adjustable, so that the direction in which light is reflected can be changed. In some examples, the light projection device 200 can include an array of light fixtures, which may be arranged in an array that is coupled to the mounting system 210. Alternatively the multiple light fixtures can be attached to individual mounting systems, and thus be independently moveable with respect to one another.

Though illustrated in FIG. 2 as mounted below the axis of the third joint 226, in other examples, the light fixture 230 can be mounted such that the center of the light beam produced by the light fixture 230 is bisected by the axis of the third joint 226.

The focusing system 240 can include various physical mechanisms that can alter the light emitted by the light fixture 230. For example, the focusing system 240 can include one or more lenses that can change the intensity and/or direction of the light. In this example, the focusing system 240 can include one or more motors that can rotate a focusing ring or multiple focusing rings of the focusing system 240, and change the focal point or direction of the light. As another example, the focusing system 240 can include one or more reflectors that can alter the angle at which light is projected through the focusing system 240. In this example, the reflectors can shape the projected light into the shape of arrows, symbols, words, and/or other shapes. The focusing system 240 may include a motor or a collection of motors that can change the angle of each reflector. As a further example, the focusing system 240 can include one or more motorized apertures that may be able to close or open into different shapes. In this example, the apertures can be used to change the shape of the light emitted by the light fixture 230, and/or can be used to block the light entirely to achieve a blinking effect without having to turn off the light fixture 230. The apertures can be used, for example, to form the projected light into the shape of arrows, letters, words, and/or other symbols.

Figure 3:
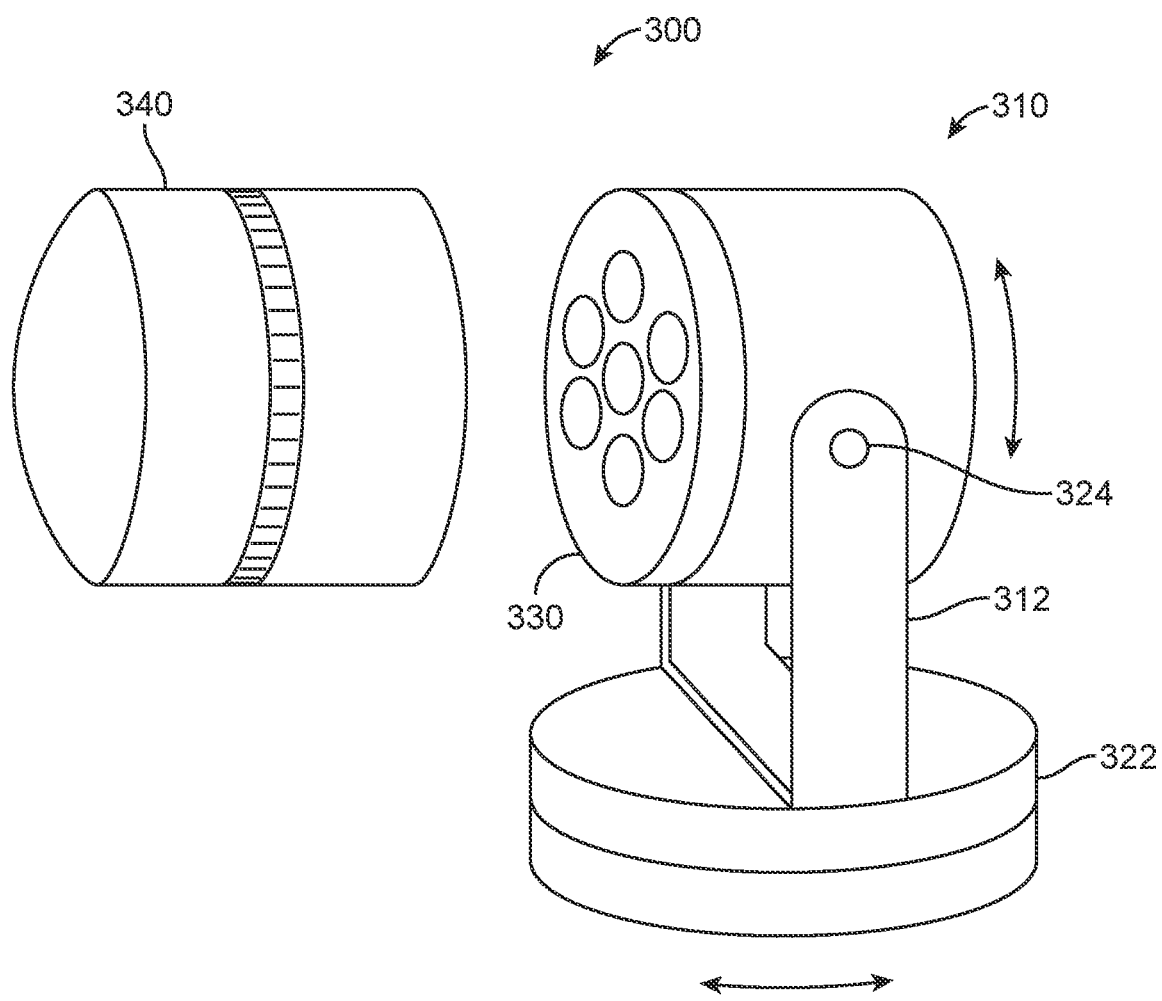
FIG. 3 is another a diagram of example components of a light projection system.

FIG. 3 is another a diagram of example components of a light projection system 300 that can be used to project the illumination patterns discussed with respect to FIGS. 1A-1E. In the example of FIG. 3, various details have been omitted so as not to obscure the illustrated components, such as wires, motors, and an overall housing.

In various examples, the light projection system 300 can include a mounting system 310, a light fixture 330, and a focusing system 340.

The mounting system 310 can provide a structure to which the light fixture 330 can be attached. The mounting system 310 can further include moveable joints that can enable rotational movement of the light fixture 330. In the example of FIG. 3, the mounting system 310 includes a first joint 322 that can rotate around a vertical axis. The first joint 322 can also be fixed to a stationary portion of the light projection system 300, such as the housing. The first joint 322 can enable left and right rotation of the light fixture 330, or panning. The example mounting system 310 further includes a second joint 324 that can rotate around a horizontal axis. The second joint 324 enables up and down rotate of the light fixture 330, or tilting. In some examples, the rotational axis of the second joint 324 is perpendicular to the direction in which the light fixture 330 projects light. The mounting system 310 can further include a set of mounting arms 312 that support the light fixture 330.

The light fixture 330 can include one or more light emitting devices, such as LEDs, halogen bulbs, and/or lasers, among others, enclosed in a house. The light fixture 330 can also include a reflector that may be motorized and moveable. In some examples, the light projection system 300 can include an array of light fixtures, which may be stationary with respect to one another or which may be individually moveable.

The focusing system 340 can include components such as lenses, reflectors, and/or apertures that can change the intensity, direction, and/or shape of the light emitted by the light fixture 330. In some examples, the focusing system 340 can be attached to the front of the light fixture 330, and can incorporate elements (e.g., lenses and/or reflectors) that are part of the light fixture 330. Alternatively, the focusing system 340 can be mounted within the light projection system 300 in front of the light fixture 330.

FIG. 4 includes a flowchart of an example process 400 for projecting light to indicate a robot's path of travel. In various examples, the process 400 can be performed by a computing device mounted to the body of an autonomous robot. The robot can include a set of wheels operable to move the robot over a ground surface. The robot can further include a light projection device mounted to the body, and configurable to project light on the ground in front of the robot. The light projection device can include a mounting system, a light fixture coupled to the mounting system, and a focusing system. The computing device can be operable to communicate with and configure the light projection device. The computing device can include a processor and a non-transitory memory or computer readable medium. The non-transitory memory can store instructions that, when executed by the processor, cause the processor to perform the steps of the process 400.

At step 402, the process 400 includes determining a path of travel for the autonomous robot, wherein the autonomous robot is operable to travel within a space occupied by people. The space may include public spaces, such as pedestrian sidewalks, streets, and/or other outdoors spaces. The space may, alternatively or additionally, include indoor spaces, such as office buildings. In these and other examples, the robot's path may be shared with people who are walking, bicycling, driving, moving in another manner, or standing still.

In some examples, the non-transitory memory of the computing device can further include instructions comprising a program for moving the autonomous robot from a first location to a second location without input from a human operator. In these examples, the robot's path of travel can be determined from determined from the program. For example, the computing device can include instructions that cause the computing device to look ahead in the robot's route, and determine a location the robot will occupy three seconds, five, seconds, or another number of seconds after a current time. The robot's future location may be based on the robot's current speed or expected speed. In this and other examples, the illumination pattern determined in the next steps can indicate the robot's future location.

At step 404, the process 400 includes determining an illumination pattern for indicating the path of travel, wherein the illumination pattern is configured to be projected onto a ground surface in front of the autonomous robot. The illumination pattern can indicate, for example, a speed by a length and/or shape of the pattern. As another example, the illumination pattern can indicate a direction the robot is traveling or will travel, such as a forward direction, a backward direction, a left direction, or a right direction. As another example, the illumination pattern can indicate that the path of travel includes the robot turning left or right.

In some examples, the illumination pattern includes motion, such as movement of the light projected by the light projection device or movement, within the projected light, of the light being emitted. In these examples, the non-transitory memory of the computing device can further include instructions for moving the mounting system according to the motion.

In some examples, the illumination pattern can include an intermittent projection pattern. For example, the pattern can including intermittently turning the projected light on and off, either by switching the light source off or by blocking the light source. As another example, the pattern can include turn parts of the projected light off in a pattern. In these and other examples, the non-transitory memory of the computing device can include instructions for adjusting the light projected by a light fixture according to the intermittent projection pattern.

At step 406, the process 400 includes configuring a mounting system to point a light fixture coupled to the mounting system according to a direction indicated by the illumination pattern. In various examples, the mounting system can include a pivoting joints, where the pivoting joints enable at least two degrees of rotational movement, or three degrees of rotational movement. The pivoting joints may be motorized or may be actuated by one or more motors. In these examples, by rotating one or more of the pivoting joints, the mounting system can be made to change the direction in which the light emitted by the light fixture lands on the ground.

At step 408, the process 400 includes configuring a focusing system to modify light projected by the light fixture to conform to the illumination pattern. The focusing system can be mounted in front of the light fixture. The focusing system can be motorized, and/or can be adjusting using motors. In various examples, the focusing system can include one or more lenses, reflectors, and/or apertures that can be used to change the intensity, direction, and/or shape of the light that is projected on the ground. In various examples, a combination of the direction in which light is emitted by the light fixture lands on the ground and the illumination pattern can indicate the robot's path of travel.

In various examples, the light projection device can include a control circuit communicatively coupled to motors that control the mounting system and/or the focusing system. In these examples, the control circuit can be operable to receive signals indicating adjustments to make to the first motor or the second motor. The signals can be generated by the robot's computing device. The signals can indicate, for example, the direction in which the light fixture should point or the illumination pattern that should be projected. As another example, the signals can indicate a pattern of movement for the light projected onto the ground surface. As another example, the signals can indicate an on and off pattern for the light projected onto the ground surface.

Specific details were given in the preceding description to provide a thorough understanding of various implementations of systems and components for a light projection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for a light projection system.

What is claimed is:

1. An autonomous robot, comprising:
   a set of wheels operable to move the autonomous robot over a ground surface;
   a body coupled to the set of wheels;
   a light projection device mounted to the body, the light projection device including a mounting system, a light fixture coupled to the mounting system, and a focusing system; and
   a computing device mounted to the body and operable to communicate with the light projection device, the computing device including a processor and a non-transitory memory operable to store instructions that, when executed by the processor, cause the processor to perform operations including:
   determining a path of travel for the autonomous robot, wherein the autonomous robot is operable to travel within a space occupied by people;
   determining an illumination pattern for indicating the path of travel, wherein the illumination pattern is configured to be projected onto a ground surface in front of the autonomous robot, wherein the illumination pattern includes a sequence that indicates the autonomous robot is going to start moving from a fully stopped state, and wherein the autonomous robot starts moving after completion of projecting the sequence;
   configuring the mounting system to point the light fixture according to the illumination pattern; and
   configuring the focusing system to modify light projected by the light fixture to conform to the illumination pattern.

2. The autonomous robot of claim 1, wherein the illumination pattern indicates a speed.

3. The autonomous robot of claim 1, wherein the illumination pattern indicates one of a forward direction, a backward direction, a left direction, or a right direction.

4. The autonomous robot of claim 1, wherein the illumination pattern indicates that the path of travel includes turning left or right.

5. The autonomous robot of claim 1, wherein the illumination pattern includes motion, and wherein the operations further include moving the mounting system according to the motion.

6. The autonomous robot of claim 1, wherein the illumination pattern includes an intermittent projection pattern, and wherein the operations further include adjusting the light projected by the light fixture according to the intermittent projection pattern.

7. The autonomous robot of claim 1, wherein the operations further include determining, using the path of travel, a location the autonomous robot will occupy a number of seconds after a current time, wherein the illumination pattern further indicates the location.

8. The autonomous robot of claim 1, wherein the non-transitory memory further includes instructions comprising a program for moving the autonomous robot from a first location to a second location without input from a human operator.

9. The autonomous robot of claim 8, wherein the path of travel is determined from the program.

10. The autonomous robot of claim 1, wherein the autonomous robot is operable to travel within a public space.

11. The autonomous robot of claim 10, wherein the public space includes pedestrian sidewalks.

12. The autonomous robot of claim 1, wherein the sequence is a countdown.

13. The autonomous robot of claim 1, wherein the sequence is a series of pattern that repeatedly stretches an illumination spot to an illumination bar.

14. The autonomous robot of claim 1, wherein the sequence is a series of pattern that repeatedly lengthens an illumination arrow.

15. A method implemented by a computing device, comprising:
  determining a path of travel for an autonomous robot, wherein the autonomous robot is operable to travel within a space occupied by people;
  determining an illumination pattern for indicating the path of travel, wherein the illumination pattern is configured to be projected onto a ground surface in front of the autonomous robot, wherein the illumination pattern includes a sequence that indicates the autonomous robot is going to start moving from a fully stopped state, and wherein the autonomous robot starts moving after completion of projecting the sequence;
  configuring a mounting system to point a light fixture coupled to the mounting system according to a direction indicated by the illumination pattern; and
  configuring a focusing system to modify light projected by the light fixture to conform to the illumination pattern.

16. The method of claim 15, wherein the sequence is a countdown.

17. The method of claim 15, wherein the sequence is a series of pattern that repeatedly stretches an illumination spot to an illumination bar.

18. The method of claim 15, wherein the sequence is a series of pattern that repeatedly lengthens an illumination arrow.

* * * * *